United States Patent [19]

Nishio et al.

[11] Patent Number: 5,302,653

[45] Date of Patent: Apr. 12, 1994

[54] THERMOPLASTIC POLYMER COMPOSITION

[75] Inventors: Takeyoshi Nishio, Okazaki; Nobuya Kawamura; Takao Nomura, both of Toyota; Hiroki Sato, Yokkaichi; Akihiko Uchikawa, Yokkaichi; Ikuo Tsutsumi, Yokkaichi; Yukitaka Goto, Yokkaichi, all of Japan

[73] Assignees: Mitsubishi Petrochemical Company Limited, Tokyo; Toyota Jidosha Kabushiki Kaisha, Toyota, both of Japan

[21] Appl. No.: 825,587

[22] Filed: Jan. 24, 1992

[30] Foreign Application Priority Data

Jan. 25, 1991 [JP] Japan .................. 3-025344

[51] Int. Cl.$^5$ ............................. C08K 3/34
[52] U.S. Cl. ........................ 524/451; 525/88; 525/240
[58] Field of Search ............ 524/451; 525/88, 240

[56] References Cited

U.S. PATENT DOCUMENTS

| | | | |
|---|---|---|---|
| 4,735,988 | 4/1988 | Takada et al. | 524/451 |
| 4,863,995 | 9/1989 | Murakami et al. | 525/79 |
| 5,086,109 | 2/1992 | Ueno et al. | 524/451 |

FOREIGN PATENT DOCUMENTS

| | | |
|---|---|---|
| 0168129 | 1/1986 | European Pat. Off. . |
| 0228543 | 7/1987 | European Pat. Off. . |
| 0412534 | 2/1991 | European Pat. Off. . |
| 2490660 | 3/1982 | France . |
| 9001519 | 2/1990 | World Int. Prop. O. . |

OTHER PUBLICATIONS

Database WPIL Derwent Publications Ltd., London, GB; and 89-281432 & JP-A-1 204 946 (Nissan Motor) Aug. 17, 1989 *abstract*.

*Primary Examiner*—Joseph L. Schofer
*Assistant Examiner*—David Wu
*Attorney, Agent, or Firm*—Oblon, Spivak, McClelland, Maier & Neustadt

[57] ABSTRACT

A thermoplastic polymer composition comprising: (i) 100 parts by weight of a thermoplastic polymer component which comprises an ethylene-propylene rubber, an ethylene copolymer and a propylene polymer (including an ethylene-propylene block copolymer), and (ii) 7 to 25 parts by weight of talc, the thermoplastic polymer component being composed of, according to fractionation using o-dichlorobenzene as a solvent, component (A) which is a component soluble in the solvent at 40° C., component (B) which is a component insoluble in the solvent at 40° C. but soluble at 110° C., and component (C) which is a component insoluble in the solvent even at 110° C. in such a proportion that the total amount of the components (A) and (B) is from 50 to 70 parts by weight, the weight ratio of the component (A) to the component (B) being from 0.5 to 1.5, and the amount of the component (C) is from 50 to 30 parts by weight; the composition having a flexural modulus of 10,000 to 20,000 kg/cm$^2$.

5 Claims, No Drawings

THERMOPLASTIC POLYMER COMPOSITION

BACKGROUND OF THE INVENTION

Field of the Invention

This invention relates to a specific thermoplastic polymer composition which comprises an ethylene-propylene rubber, an ethylene copolymer, a propylene polymer (including an ethylene-propylene block copolymer) and talc, shows good processability on injection molding, can give a molded product having a good appearance, is excellent in the flexural modulus, tensile properties, surface hardness, impact resistance and adhesion of coating, and thus is suited for the production of injection-molded products such as automobile parts.

Background Art

Heretofore, many attempts have been made to enhance the value of molded products of various rubbers such as an ethylene-propylene copolymer rubber by improving their fluidity and imparting rigidity to them. For instance, compositions prepared by incorporating polypropylene to rubber have been known as disclosed in Japanese Patent Publications Nos. 57-57049, 62-5460 and 62-5461. However, the proportion of polypropylene in these compositions is generally small, and polypropylene having high fluidity and high crystallinity is not particularly employed, so that the compositions have low crystallization rates. A long cooling time is therefore required when large-sized molded products of the compositions are produced by means of injection molding. The productivity is thus extremely low. In addition, since the compositions contain neither polyethylene nor talc, they give only such molded products that are insufficient in the flexural modulus and surface hardness.

The composition disclosed in Japanese Patent Publication No. 61-19651 comprises a relatively large amount of polypropylene. However, this composition also contains neither polyethylene nor talc. Moreover, partially crosslinked rubber is used as a rubber component. For these reasons, the composition is also confronted with the same problems as in the above compositions in the productivity upon producing molded products, and in the flexural modulus and surface hardness of molded products.

On the other hand, Japanese Patent Publication No. 60-3420 discloses a composition prepared by incorporating an ethylene-propylene rubber and talc into a propylene-ethylene block copolymer. This composition is excellent in adhesion of coating and low-temperature impact resistance. Further, Japanese Patent Publications Nos. 59-49252 and 63-65223 and Japanese Patent Laid-Open Publications Nos. 61-276840 and 1-204946 disclose compositions comprising an ethylene-propylene rubber, a propylene-ethylene block copolymer, an ethylene polymer and talc. These compositions can give molded products having an improved appearance and enhanced adhesion of coating. These molded products are, however, still insufficient in the flexural modulus. They also have the drawback of being easily flawed due to their low surface hardness.

It is therefore an object of the present invention to solve the above problems in the prior art and provide a thermoplastic polymer composition which shows good processability on injection molding, can give an injection-molded product having a good appearance, and is excellent in the flexural modulus, tensile properties, surface hardness, impact resistance and adhesion of coating.

SUMMARY OF THE INVENTION

It has now been found that the above object can be achieved by blending an ethylene-propylene rubber, an ethylene copolymer and a propylene polymer, and talc in a specific proportion.

Thus, the present invention provides a thermoplastic polymer composition comprising (i) 100 parts by weight of a thermoplastic polymer component which comprises an ethylene-propylene rubber, an ethylene copolymer and a propylene polymer (including an ethylene-propylene block copolymer), and (ii) 7 to 25 parts by weight of talc, the thermoplastic polymer component being composed of, according to fractionation using o-dichlorobenzene as a solvent, component (A) which is a component soluble in the solvent at 40° C., component (B) which is a component insoluble in the solvent at 40° C. but soluble at 110° C., and component (C) which is a component insoluble in the solvent even at 110° C. in such a proportion that the total amount of the components (A) and (B) is from 50 to 70 parts by weight, the weight ratio of the component (A) to the component (B) being from 0.5 to 1.5, and the amount of the component (C) is from 50 to 30 parts by weight; said composition having a flexural modulus of 10,000 to 20,000 kg/cm$^2$.

The composition of the present invention shows good processability when subjected to injection molding, can give molded products which have a good appearance, and is excellent in the flexural modulus, tensile properties, surface hardness, impact resistance and adhesion of coating.

More specifically, the present invention provides, for instance, a composition having a melt flow rate (MFR) of 10 g/10 min or more, a flexural modulus of 10,000 kg/cm$^2$ or more, an elongation at break of 200% or more, a Rockwell hardness of 50 or more, an Izod impact strength at $-30°$ C. of 5.0 kg.cm/cm or more, and a peeling strength of a coated film, which will be described later, is 700 g/cm or more.

Moreover, since the proportion of a high-crystalline component, the component (C), contained in the composition of the present invention is larger than that in the conventional thermoplastic polymer compositions, the composition of the invention can be solidified by cooling in a shorter time than before. The cooling time required in the process of injection molding can thus be shortened. This brings about a remarkable increase in the production speed of molded products.

The composition of the present invention, which has the above-described advantageous properties, is suitably utilized for injection-molded automobile parts, especially for large-sized parts which needs coating and require a high rigidity and flaw-resistance, such as a bumper, an air dam spoiler and a fascia.

DETAILED DESCRIPTION OF THE INVENTION

The ethylene-propylene rubber for use in the present invention should have an MFR (at 230° C.) of 0.3 to 3.0 g/10 min, preferably 0.5 to 2.0 g/10 min, and contain a proper amount of crystalline segment in the molecule. In the present invention, an ethylene-propylene rubber which contains 12% to 30% by weight, preferably 15% to 25% by weight, of propylene, and has a melting point determined by a differential scanning calorimeter of 30° to 60° C., preferably 35° to 55° C., is preferred from the viewpoint of surface hardness, impact resistance and adhesion of coating. The ethylene-propylene rubber may be an EPDM containing ethylidene norbornene, dicyclopentadiene, 1,4-hexadiene or the like as a third component. The ethylene-propylene rubber may also be a mixture of EPM and EPDM.

It is desirable that the ethylene copolymer to be used in the present invention have an MFR (at 230° C.) of 1.0 to 10 g/10 min, preferably 2.0 to 8.0 g/10 min, from the viewpoint of processability and impact resistance; a melting point determined by a differential scanning calorimeter of 60° to 100° C., preferably 65° to 90° C., because it is important that the crystallinity of the ethylene copolymer be not too high when the compatibility between the ethylene-propylene rubber and the ethylene copolymer is taken into consideration; and a density of 0.92 g/cm$^3$ or less, preferably 0.91 g/cm$^3$ or less, from the viewpoint of surface hardness, impact resistance, tensile properties and adhesion of coating.

The above-described ethylene copolymer can be prepared by copolymerizing ethylene and an $\alpha$-olefin in the presence of an ionic polymerization catalyst such as a Ziegler catalyst, a Phillips catalyst or a Kaminsky catalyst. Production methods applicable to the above copolymerization may be a gas phase fluidized bed method, a solution method, a slurry method, and a high pressure ionic polymerization method in which polymerization is carried out under a pressure of 200 kg/cm$^2$ or more at a temperature of 150° C. or higher. As long as the melting point of the resulting copolymer falls within the above range, the copolymer is suitably used independently of the $\alpha$-olefin content. The $\alpha$-olefin to be copolymerized with ethylene is a 1-olefin having 3 to 8 carbon atoms. Examples of the 1-olefin include propylene, butene-1, 3-methylbutene-1, pentene-1, 4-methylpentene-1, hexene-1, heptene-1 and octene-1. Such $\alpha$-olefins may be used singly or as a mixture of two or more.

From the viewpoint of processability and impact resistance, it is preferred that the propylene polymer for use in the present invention be a propylene-ethylene block copolymer having an MFR (at 230° C.) of 30 to 150 g/10 min, preferably 50 to 100 g/10 min, and containing 1.5% to 8.0% by weight, preferably 2.0% to 7.0% by weight, of ethylene. It is also preferred that the propylene-ethylene block copolymer contain a crystalline propylene polymer moiety with a density of 0.907 g/cm$^3$ or more, preferably 0.908 g/cm$^3$ or more, when surface hardness is taken into consideration.

The above mentioned MFR of the propylene polymer may be controlled at the time of polymerization, or adjusted by an organic peroxide such as a diacyl peroxide or a dialkyl peroxide after the polymerization is completed.

The propylene polymer can be a copolymer with other unsaturated monomer such as maleic anhydride, methacrylic acid or trimethoxyvinylsilane which is introduced thereto by graft or random copolymerization. In particular, the use of a mixture of the propylene polymer and a crystalline polypropylene grafted with maleic anhydride or trimethoxyvinylsilane can improve the surface hardness of the resulting composition.

A stereospecific catalyst is employed for the production of the above propylene polymer. Typical preparation methods of the catalyst are a method as disclosed in Japanese Patent Laid-Open Publication Nos. 56-100806, 56-120712 and 58-104907, in which a titanium trichloride composition prepared by reducing titanium tetrachloride with an organoaluminum compound and then treating with various electron donors and electron acceptors is combined with an organoaluminum compound and an aromatic carboxylic acid ester; and a method as disclosed in Japanese Patent Laid-Open Publications Nos. 57-63310, 63-43915 and 63-83116, in which titanium tetrachloride and various electron donors are brought into contact with a magnesium halide to give a carrier-type catalyst.

The above three kinds of polymer components are mixed so that the resulting polymer mixture (thermoplastic polymer component) can be composed of, according to fractionation using o-dichlorobenzene as a solvent, component (A) which is a component soluble in the solvent at 40° C., component (B) which is a component insoluble in the solvent at 40° C. but soluble at 110° C., and component (C) which is a component insoluble in the solvent even at 110° C. in such a proportion that the total amount of the components (A) and (B) is from 50 to 70 parts by weight, the weight ratio of the component (A) to the component (B) is from 0.5 to 1.5, and the amount of component (C) is from 50 to 30 parts by weight.

In the case where the total amount of the components (A) and (B) is less than the above range, that is, the amount of the component (C) is in excess of the above range, the resulting composition has a poor impact resistance. On the other hand, when the total amount of the components (A) and (B) is more than the above range, the resulting composition cannot have a sufficiently high flexural modulus. Further, when the weight ratio of the component (A) to the component (B) [component (A)/component (B)] is less than the above range, the resulting composition will exhibit a poor adhesion of coating; while when the weight ratio is in excess of the above range, the composition will have poor tensile properties, and a molded product of the composition should easily cause brittle fracture when impact is given to it.

When the intrinsic viscosity ($[\eta]$) of the component (C) is high, the resulting composition requires a high molding temperature, leading to an increase in molding cycle. It is therefore desirable that the intrinsic viscosity of the component (C) be 2.0 dl/g or less, preferably 1.7 dl/g or less.

The crystallinity of the propylene polymer can be shown by the proportion of highly-crystalline polypropylene, an index of which can be given by the following formula:

$$\frac{\text{Amount of component (C)}}{(\text{Amount of component (C)} + \text{Amount of component (D)})}$$

wherein component (D) indicates a polypropylene moiety contained in the component (B), determined by $^{13}$C-NMR. In the present invention, it is preferred that the above index be 0.70 or more, preferably 0.75 or more, from the viewpoint of surface hardness.

In the present invention, use may be made of a mixture of two or more kinds of the ethylene-propylene rubber, two or more kinds of the ethylene copolymer, and two or more kinds of the propylene polymer, as long as the components (A), (B), (C) and (D) of the resulting thermoplastic polymer component can satisfy the aforementioned conditions.

The talc usable in the present invention should preferably have an average particle size of 5.0 $\mu$m or less, preferably from 0.5 to 3.0 μm, and a specific surface area of 3.5 m²/g or more, preferably from 3.5 to 6.0 m²/g. Such talc may be prepared by a dry pulverization and the subsequent dry classification. When the average particle size of talc is in excess of 5.0 μm, the resulting composition is likely to exhibit a poor impact resistance. When the specific surface area of talc is less than 3.5 m²/g, the resulting composition is likely to have an insufficient flexural modulus. The average particle size of talc herein is a particle size at a cumulative amount of 50% by weight in a cumulative particle size distribution curve obtained by a liquid phase sedimentation light transmission method using, for instance, Model CP manufactured by Shimadzu Corp. The specific surface area can be measured by an air permeation method using, for instance, a specific surface area measuring apparatus Model SS-100 manufactured by Shimadzu Corp.

To impart high adhesion of coating to a molded product of the composition of the invention, it is preferable to control the amount of a non-crystalline moiety in the molded product to 50% by weight or more of the total amount of the resin components contained therein. Specifically, it is preferable that the thermoplastic polymer component comprising the ethylene-propylene rubber, the ethylene copolymer and the propylene polymer have a degree of crystallinity, determined by pulsed NMR, of 50% or less.

The amount of talc to be used is from 7 to 25 parts by weight, preferably from 10 to 20 parts by weight, for 100 parts by weight of the total amount of the ethylene-propylene rubber, the ethylene copolymer and the propylene polymer. When the amount of talc is less than 7 parts by weight, the resulting composition cannot have a sufficiently high flexural modulus. On the other hand, when the amount of talc is in excess of 25 parts by weight, the resulting composition has a poor impact resistance.

The talc can be used without subjecting to any treatment. However, in order to improve the adhesion between the talc and the polymers, or the dispersibility of the talc in the polymers, the talc may be treated with various organic titanate coupling agents, silane coupling agents, fatty acids, metal salts of fatty acid, fatty acid esters, and the like.

Other auxiliary components may be added to the composition of the present invention unless they substantially impair the advantageous properties of the composition.

Examples of the auxiliary components usable in the present invention include additives which are conventionally employed in thermoplastic polymer compositions, for example, a processing stabilizer, an antioxidant, an ultraviolet absorber, a light stabilizer, various soaps such as metal soaps, an antistat, a lubricant, a nucleator, a pigment and a dispersant for pigment. In addition, whiskers such as fibrous potassium titanate, fibrous magnesium oxalfate and fibrous aluminum borate, and carbon fibers, which are known as materials capable of imparting higher flexural modulus than that imparted by talc, can be employed, if necessary.

The composition of the present invention can be prepared by kneading the polymer components, the talc, and, if necessary, the auxiliary components by any of an ordinary extruder, a Banbury mixer, a roller, a Brabender and a kneader. However, the use of a twin-screw extruder is desirable in the present invention.

From the composition of the present invention, molded products may be prepared by any known molding method such as an injection molding method, an extrusion molding method and a blow molding method. However, an injection molding method will be most advantageously employed in view of the inherent properties of the composition.

The composition of the present invention has a flexural modulus of 10,000 to 20,000 kg/cm², preferably 12,000 to 18,000 kg/cm². When the flexural modulus is too low, the practical strength of a molded product will be lowered. It may therefore be necessary to increase the thickness of the molded product or to reinforce it. In addition, a molded product of a low flexural modulus tends to have a low surface hardness, so that it is easily flawed. On the other hand, when the flexural modulus is too high, the impact resistance of the composition is often too poor.

This invention will now be explained in more detail with reference to the following examples, which are given merely for illustration of this invention and are not intended to be limiting thereof.

In the examples, solvent fractionation was carried out in the following manner:

(1) 5 g of a sample and 1.5 g of 2,6-di-t-butyl-p-phenol as an antioxidant were dissolved in 1.5 l of o-dichlorobenzene at 140° C. The resulting mixture was filtrated through a 0.45-μm Teflon filter at 140° C. to remove insoluble components such as a filler.

(2) After redissolving the filtrate at 140° C., 300 g of Celite (#545) was added to the solution. While stirring, the resulting mixture was cooled to room temperature at a cooling rate of 10° C./hour to provide a coating on the surface of the Celite.

(3) The coated Celite was filled in a cylindrical column. To this column, o-dichlorobenzene containing the above antioxidant in the same concentration as above was introduced, and fractionation was carried out by heating the column to temperatures of 40° C., 110° C. and 140° C. thereby to elute the coating.

(4) After the fractionation was completed, a large amount of methanol was added to each fraction, followed by filtration through a 0.45-μm Teflon filter. After drying in vacuum, each fraction was weighed. The proportion of each fraction was determined on the basis of the total weight of the three fractions.

Measuring methods used in the examples are as follows:

(i) Melting Point: 10 mg of a sample was placed in a differential scanning calorimeter, for instance, Model 910 manufactured by Du Pont Corp. After heating to a temperature of +180° C., the sample was cooled to −100° C. at a constant cooling rate of 10° C./min. Thereafter, the sample was heated again at a constant heating rate of 20° C./min. A temperature corresponding to the peak of the thermogram obtained was taken as the melting point of the sample.

(ii) Intrinsic Viscosity: A sample polymer was dissolved in o-dichlorobenzene containing 0.2% by weight of the above-mentioned antioxidant to give solutions of various concentrations, ranging from 0.1 to 0.3 g/dl, of the polymer. Measurements of viscosity were carried out at a temperature of 140° C. The intrinsic viscosity of the polymer was determined by extrapolating to a point of zero concentration of the solution.

(iii) Propylene Content in component (B): The propylene content was determined by an integrated intensity of signals deriving from a polypropylene carbon, which appear in the vicinity of 46.5 ppm from TMS (tetramethylsilane) in a $^{13}$C-NMR spectrum.

(iv) Total Crystallinity of Resin: Determined by pulsed NMR (see Kobunshi Jikkengaku 18, "Magnetic Resonance of Polymer", pp. 143-144, Kyoritsu Shuppan Kabushiki Kaisha).

(v) MFR: Measured in accordance with ASTM-D1238 with application of a load of 2.16 kg at a temperature of 230° C.

(vi) Density: Measured in accordance with ASTM-D1505 at a temperature of 23° C.

(vii) Flexural Modulus: Measured in accordance with ASTM-D790 at a temperature of 23° C.

(viii) Elongation at Break: Measured in accordance with ASTM-D638 at a temperature of 23° C.

(ix) Surface Hardness: Evaluated by a Rockwell hardness (Scale R), measured in accordance with ASTM-D785 at a temperature of 23° C.

(x) Impact Resistance: Evaluated by an Izod value at a temperature of −30° C., measured in accordance with ASTM-D256.

(xi) Adhesion of Coating: Evaluated by the peeling strength of a coated film, determined in accordance with the following manner:

1 Coating Method a. An injection-molded specimen was exposed to the vapor of boiling 1,1,1-trichloroethane for 30 seconds, and then allowed to stand at room temperature for 30 minutes for drying.

b. The lower half of the surface of the specimen was covered with a masking tape while the upper half thereof remained uncovered.

c. A polyurethane-modified polyolefin primer for polypropylene, "Soflex 2500" manufactured by Kansai Paint Co., Ltd., was coated onto the specimen by means of spray coating to form a primer layer with a thickness of approximately 10 μm. After drying the primer at room temperature for 30 minutes, the masking tape was peeled off the specimen.

d. A one-can urethane coating containing an isocyanate hardening agent, "Flexen 105" manufactured by Nihon B-Chemical K. K., was then coated onto the specimen by means of spray coating to form a coating layer with a thickness of approximately 80 μm. The specimen was placed in an air oven adjusted to a temperature of 120° C. for 30 minutes to bake the coating, and then allowed to stand at room temperature for 48 hours. The specimen thus obtained was used in the peeling strength test described below.

2 Measurement a. A cellophane adhesive tape was adhered to the entire surface of the test specimen obtained above. On the surface of the adhesive tape, cuts reaching to the base were made by a cutter in the long direction of the specimen at 10-mm intervals.

b. The coating layer formed on the surface not coated with primer was peeled, together with the cellophane adhesive tape adhered thereon, off the specimen, and bent to the 180-degree direction. The specimen in this state was set in a tensile tester.

c. The tester was operated at 23° C. at a rate of pulling of 50 mm/min. From the curve obtained on the recorder, a value corresponding to the peak was determined. The average of such values for ten peaks was taken herein as the value indicating the peeling strength of coating of the specimen.

EXAMPLES 1 TO 6 And COMPARATIVE EXAMPLES 1 TO 6

Materials shown in Table 1 were mixed in accordance with the formulation shown in Table 2. To the resulting mixture, 0.1 part by weight of 2,6-di-t-butyl-p-phenol, 0.1 part by weight of tetrakis[methylene-3-(3′,5′-di-t-butyl-4′-hydroxyphenyl)propionate]methane and 0.5 part by weight of carbon black were added, and mixed by a "Super Mixer" manufactured by Kawada Seisakusho K. K. for 5 minutes. The mixture thus obtained was kneaded and granulated at 210° C. by a twin-screw kneader, "FCM" manufactured by Kobe Steel Ltd., to give a thermoplastic polymer composition.

TABLE 1

Materials for Use in Examples and Comparative Examples

<Ethylene-Propylene Rubber>

| Type | MFR (g/10 min) | Propylene Content (% by weight) | Melting Point (°C.) |
| --- | --- | --- | --- |
| EFR-1 | 1.0 | 12 | 79 |
| EFR-2 | 1.8 | 16 | 53 |
| EFR-3 | 0.6 | 24 | 39 |
| EFR-4 | 0.9 | 32 | 19 |

<Ethylene Copolymer>

| Type | MFR (g/10 min) | Density (g/cm$^3$) | Melting Point (°C.) |
| --- | --- | --- | --- |
| PEX-1 | 3.5 | 0.915 | 105 |
| PEX-2 | 2.3 | 0.900 | 88 |
| PEX-3 | 7.5 | 0.882 | 68 |
| PEX-4 | 4.8 | 0.865 | 41 |

<Propylene Polymer>

| Type | MFR (g/10 min) | Ethylene Content (% by weight) | Density of Propylene Polymer Moiety (g/cm$^3$) |
| --- | --- | --- | --- |
| PP-1 | 16 | 4.5 | 0.907 |
| PP-2 | 55 | 7.2 | 0.905 |
| PP-3 | 53 | 4.0 | 0.908 |
| PP-4 | 87 | 5.5 | 0.907 |
| PP-5 | 142 | 2.7 | 0.911 |

<Talc>

| Type | Average Particle Size (μm) | Specific Surface Area (m$^2$/g) |
| --- | --- | --- |
| Talc-1 | 1.6 | 4.1 |
| Talc-2 | 2.7 | 3.9 |
| Talc-3 | 5.3 | 2.8 |

TABLE 2

| | EPR | | PEX | Formulation | PP | | Talc | |
|---|---|---|---|---|---|---|---|---|
| | Type | Parts by Weight | Type | Parts by Weight | Type | Parts by Weight | Type | Parts by Weight |
| Ex. 1 | EPR-2 | 20 | PEX-2 | 20 | PP-3 | 60 | Talc-1 | 15 |
| Ex. 2 | EPR-3 | 15 | PEX-3 | 15 | PP-3 | 70 | Talc-1 | 15 |
| Ex. 3 | EPR-3 | 15 | PEX-2 | 20 | PP-3 | 65 | Talc-2 | 15 |
| Ex. 4 | EPR-3 | 20 | PEX-2 | 15 | PP-4 | 65 | Talc-1 | 15 |
| Ex. 5 | EPR-3 | 20 | PEX-2 | 15 | PP-4 | 65 | Talc-1 | 20 |
| Ex. 6 | EPR-3 | 20 | PEX-2 | 15 | PP-3 | 65 | Talc-1 | 10 |
| Comp. Ex. 1 | EPR-1 | 25 | PEX-1 | 25 | PP-3 | 50 | Talc-1 | 15 |
| Comp. Ex. 2 | EPR-4 | 10 | PEX-4 | 10 | PP-3 | 80 | Talc-1 | 15 |
| Comp. Ex. 3 | EPR-3 | 5 | PEX-2 | 30 | PP-3 | 65 | Talc-3 | 15 |
| Comp. Ex. 4 | EPR-3 | 30 | PEX-2 | 5 | PP-5 | 65 | Talc-1 | 15 |
| Comp. Ex. 5 | EPR-3 | 20 | PEX-2 | 15 | PP-2 | 65 | Talc-1 | 30 |
| Comp. Ex. 6 | EPR-3 | 20 | PEX-2 | 15 | PP-1 | 65 | Talc-1 | 5 |

Injection-molded specimens of the above obtained thermoplastic polymer compositions were respectively prepared by an injection molding machine with a clamp pressure of 100 ton at a molding temperature of 220° C. The properties of the specimens were evaluated in accordance with the above-described measuring methods. The results are shown in Tables 3 and 4.

TABLE 3

| | Examples | | | | | |
|---|---|---|---|---|---|---|
| | 1 | 2 | 3 | 4 | 5 | 6 |
| component (A) + component (B) parts by weight | 67 | 54 | 60 | 62 | 58 | 61 |
| component (A)/component (B) | 0.8 | 0.9 | 0.6 | 1.5 | 1.3 | 1.2 |
| [η] of component (C) dl/g | 0.8 | 1.2 | 1.4 | 1.4 | 1.3 | 1.3 |
| Proportion of high-crystalline PP | 0.80 | 0.81 | 0.79 | 0.72 | 0.75 | 0.81 |
| Total crystallinity of resin % | 40 | 46 | 45 | 43 | 43 | 43 |
| MFR g/10 min | 15 | 17 | 17 | 20 | 16 | 18 |
| Flexural modulus Kg/cm$^2$ | 10,800 | 14,900 | 14,200 | 13,900 | 17,700 | 11,400 |
| Elongation at break % | 500 | 430 | 510 | 510 | 450 | 490 |
| Rockwell hardness | 52 | 68 | 62 | 55 | 57 | 54 |
| Izod value (at −30° C.) Kg · cm/cm | 8.2 | 5.3 | 5.9 | 6.3 | 5.8 | 7.9 |
| Peeling strength of coating g/cm | 920 | 780 | 710 | 850 | 850 | 830 |

(Note)
Proportion of high-crystalline PP = Amount of component (C)/(Amount of component (C) + Amount of component (D))

TABLE 4

| | Comparative Examples | | | | | |
|---|---|---|---|---|---|---|
| | 1 | 2 | 3 | 4 | 5 | 6 |
| component (A) + component (B) parts by weight | 74 | 45 | 58 | 60 | 55 | 63 |
| component (A)/component (B) | 1.0 | 0.8 | 0.3 | 2.5 | 1.5 | 1.2 |
| [η] of component (C) dl/g | 1.2 | 1.3 | 1.4 | 0.9 | 1.7 | 2.4 |
| Proportion of high-crystalline PP | 0.79 | 0.80 | 0.79 | 0.86 | 0.66 | 0.76 |
| Total crystallinity of resin % | 36 | 48 | 43 | 52 | 40 | 45 |
| MFR g/10 min | 12 | 20 | 20 | 27 | 11 | 6.7 |
| Flexural modulus Kg/cm$^2$ | 9,000 | 16,500 | 14,400 | 14,000 | 20,600 | 8,500 |
| Elongation at break % | 340 | 280 | 550 | 90 | 480 | 500 |
| Rockwell hardness | 50 | 47 | 63 | 52 | 42 | 58 |
| Izod value (at −30° C.) Kg · cm/cm | 7.5 | 3.9 | 4.0 | 5.1 | 4.6 | 7.5 |
| Peeling strength of coating g/cm | 480 | 770 | 490 | 510 | 820 | 850 |

(Note)
Proportion of high-crystalline PP = Amount of component (C)/(Amount of component (C) + Amount of component (D))

What is claimed is:

1. A thermoplastic polymer composition in which the thermoplastic polymer component consists essentially of component (i) defined below and which thermoplastic polymer composition comprises:

(i) 100 parts by weight of a thermoplastic polymer component which consists essentially of an ethylene-propylene rubber, an ethylene copolymer having a melting point of 60° to 100° C. obtained by copolymerizing ethylene and an α-olefin, and a propylene polymer and (ii) 7 to 25 parts by weight of talc, the thermoplastic polymer component having a degree of crystallinity, determined by pulsed NMR, of 50% or less and being composed of, according to fractionation using o-dichlorobenzene as a solvent, component (A) which is a component soluble in the solvent at 40° C., component (B) which is a component insoluble in the solvent at 40° C. but soluble at 110° C. and component (C) which is a component insoluble in the solvent even at 110° C. in such a proportion that the total amount of the components (A) and (B) is from 50 to 70 parts by weight, the weight ratio of the component (A) to the component (B) being from 0.5 to 1.5, and the amount of the component (C) is from 50 to 30 parts by weight;

said composition having a flexural modulus of 10,000 to 20,000 kg/cm2.

2. A thermoplastic polymer composition according to claim 1, wherein the ethylene-propylene rubber has a melting point of 30° to 60° C.

3. The thermoplastic polymer composition according to claim 1, wherein the component (C) has an intrinsic viscosity of 2.0 dl/g or less.

4. The thermoplastic polymer composition according to claim 1, wherein the amount of the component (C), and that of component (D) which is a polypropylene moiety contained in the component (B), determined by $^{13}$C-NMR, satisfy the following condition:

Amount of the component (C)/
(Amount of the component (C)+
Amount of the component (D))>0.70.

5. The thermoplastic polymer composition according to claim 1, wherein the talc has an average particle size of 5.0 μm or less and a specific surface area of 3.5 m²/g or more.

* * * * *